United States Patent [19]

Ohnishi et al.

[11] Patent Number: 4,611,345

[45] Date of Patent: Sep. 9, 1986

[54] BANK BILL IDENTIFICATION DEVICE

[75] Inventors: Kazuhiko Ohnishi; Masaaki Hayashi, both of Himeji, Japan

[73] Assignee: Glory Kogyo Kabushiki Kaisha, Himeji, Japan

[21] Appl. No.: 580,364

[22] Filed: Feb. 15, 1984

[30] Foreign Application Priority Data

Apr. 6, 1983 [JP] Japan ................. 58-60576

[51] Int. Cl.[4] ............................ G06K 9/00
[52] U.S. Cl. ............................ 382/7; 356/71
[58] Field of Search ............. 382/7; 209/534; 356/71; 250/556, 571

[56] References Cited

U.S. PATENT DOCUMENTS

| 2,951,164 | 8/1960 | Timms | 250/556 |
|---|---|---|---|
| 3,187,891 | 6/1965 | Chichester | 209/534 |
| 3,220,549 | 11/1965 | Wong | 209/534 |
| 4,179,685 | 12/1979 | O'Maley | 382/7 |
| 4,539,702 | 9/1985 | Oka | 382/7 |

Primary Examiner—Leo H. Boudreau
Assistant Examiner—Jacqueline Todd
Attorney, Agent, or Firm—Wenderoth, Lind & Ponack

[57] ABSTRACT

There has been proposed in prior art an identification device which identifies the denomination of a bank bill from the numerical figures thereon; however, it is of a simple type which recognizes the numerical figures by the variation of the light level reflected from the portion of a note having such numerical figures printed thereon by means of a sensor to thereby identify the denomination thereof. The device is detrimental in that a note is erroneously identified due to stains on the note. It is not quite practically usable as it is necessary to convey a note with one of the edges thereof placed under a strict control so that the numerical portion thereof should be surely passed through the sensing position. According to this invention, one-dimensional image sensors are provided over the numerical portion on both sides of a note, signals output from the image sensors in time serial are encoded and characteristic signals for the numerical figures on the note are formed. The characteristic signals are stored for each scanning of the image sensors, thus stored data is computed to be compared with the reference data which has been stored corresponding to the denomination of notes, thereby identifying the denomination of the note.

13 Claims, 35 Drawing Figures

REFRACTIVE
INDEX
DISTRIBUTION

ZONE 1 { ZONE 11 → 0 b 2b 2b 2b b
ZONE 12 → b 0 b a a b

ZONE 2 { ZONE 21 → a a a b 0
ZONE 22 → 0 0 b 0 0 0

| ADDRESS | CONTENT | |
|---|---|---|
| 2001 | VALUES OF COUNTERS 16 AND 17 | →"1001" |
| 2002 | ditto | |
| 2006 | ditto | |
| 2051 | NUMBER OF SIGNAL "0" | |
| 2052 | NUMBER OF SIGNAL "b" | |
| 2053 | NUMBER OF SIGNAL "2b" | |
| 2057 | NUMBER OF SIGNAL "6b" | |
| 2058 | NUMBER OF SIGNAL "a" | |
| 2059 | NUMBER OF SIGNAL "a+b" | |
| 2060 | NUMBER OF SIGNAL "a+2b" | |
| 2061 | NUMBER OF SIGNAL "a+3b" | |

ZONE 11: 2001–2006
ZONE 12, ZONE 21, ZONE 22
ZONE 11: 2051–2061

BANK BILL IDENTIFICATION DEVICE

BACKGROUND OF THE INVENTION

This invention relates to a bank bill identification device which identifies the type of the denomination of a note and, more particularly, to a device which identifies a note by reading the numerical figures printed thereon.

There has been proposed a device which identifies the denomination of a note by numerical figures printed thereon, but it is of a simple structure which moves a note in the longitudinal direction by using a photodiode or the like and detects the figure by the variation of the light level reflected from the portion of the note where the figure is printed. The device therefore has not been practically usable as it makes mistakes in identification due to a local stain, or as a surface of a note should be transferred under a strict control so that a predetermined portion of the figures on the note be passed through at a sensor position with an extremely high accuracy.

SUMMARY OF THE INVENTION

An object of this invention is to provide a practically usable identification device which can identify a note even though it is stained either partially or wholly and which does not have to strictly control the transfer of the surface of the note.

Another object of this invention is to provide a device which can optically detect the denomination figures on a note very accurately with a simple structure.

Still another object of this invention is to provide a simple circuit which forms a characteristic signal which features a denomination figure.

Accordingly, there is provided a bank bill identification device which comprises: a conveying means which conveys a note in a predetermined direction; a light source which projects light onto said note; one-dimensional image sensors which are arrayed linearly in a predetermined direction of said note and which repeatedly output in time series signals corresponding to the light reflected from said note by scanning; a characteristic signal forming means which encodes the output from said one-dimensional image sensors to form characteristic signals of the numerical figures representing denomination of said note; and a memory/arithmetic means which stores the data from said characteristic signal forming means for each scanning of said one-dimensional image sensors, computes thus stored data, compares the data with the data which has been stored corresponding to denominations of notes, and identifies the denomination of said note.

The nature, principle and utility of the invention will become more apparent from the following detailed description when read in conjunction with the accompanying drawings.

DETAILED DESCRIPTION OF THE INVENTION

This invention will now be described referring to attached drawings.

Figure 1:
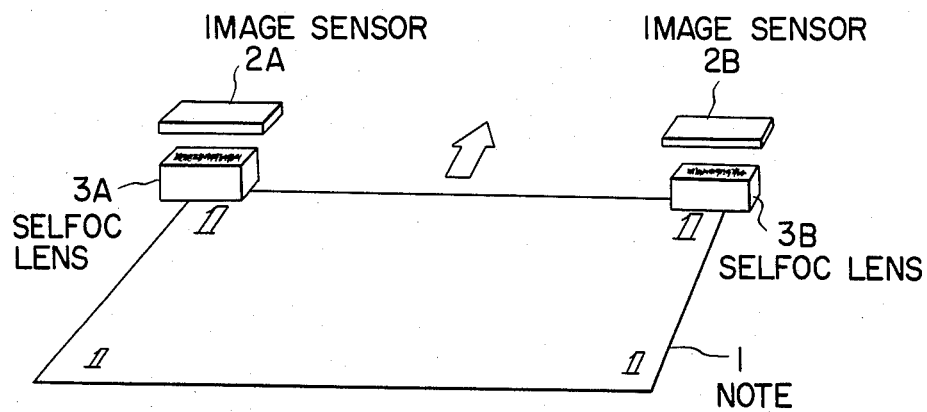
FIG. 1 is a schematic view to roughly explain the sensors according to this invention.
Figure 2:
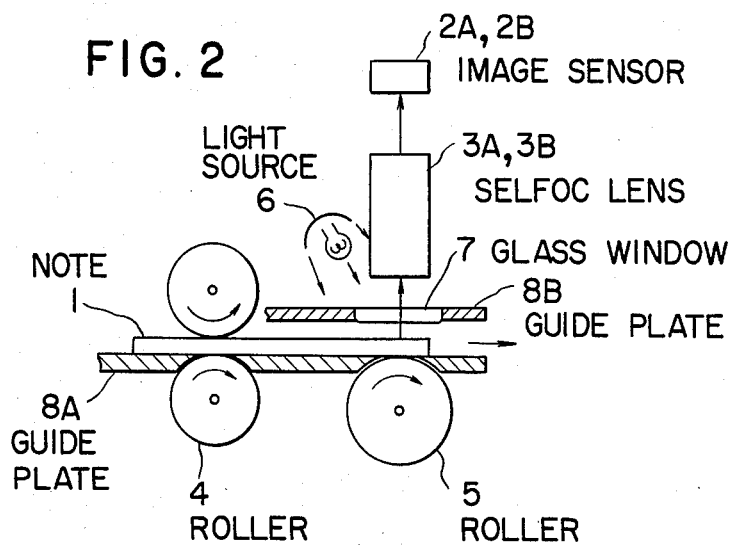
FIG. 2 is a partially sectional view to show the structure of the conveying mechanism thereof.
Figures 3A, 3B:
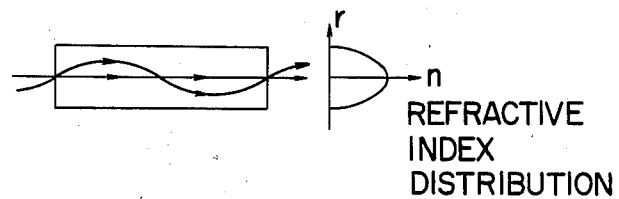
FIGS. 3A and 3B are explanatory views to show the principle of a Selfoc lens used for this invention.

FIG. 1 shows a detection section which optically detects the denomination figures printed on a bank bill (for instance, a U.S. one-dollar note). The detectors detect the numerical figures (or the amount of money) printed on the four corners of a note 1 by a pair of image sensors 2A and 2B through Selfoc lens arrays 3A and 3B. The note is, as shown in FIG. 2, made to be conveyed in the direction of a note shown in the figure (or the transverse direction) by rollers 4 and 5 and guide plates 8A and 8B. The denomination figure detecting portion which detects figures of a note 1 with image sensors 2A and 2B is structured to project light onto a conveyed note through a glass window 7 provided on the guide plate 8B from a light source 6 such as a lamp. The light reflected from the note 1 is made to be inputted into the image sensors 2A and 2B respectively through Selfoc lens arrays 3A and 3B. The roller 5 underneath the glass window 7 is painted black so that it does not reflect the light from the light source 6 while the note is not being passed. Selfoc lens arrays 3A and 3B are respectively composite lens components made by arranging a plural number of Selfoc lenses in linear form to focus and erect real image of a larger width and of an equivalent magnification. A Selfoc lens which is an element is a glass rod having a refractive index distribution n which varies from the central axis substantially parabolicly toward the periphery r as shown in FIG. 3B and the beam thereof traces the locus as shown in FIG. 3A. The glass window 7 is not necessarily provided and may be a through hole instead.

Figure 4:
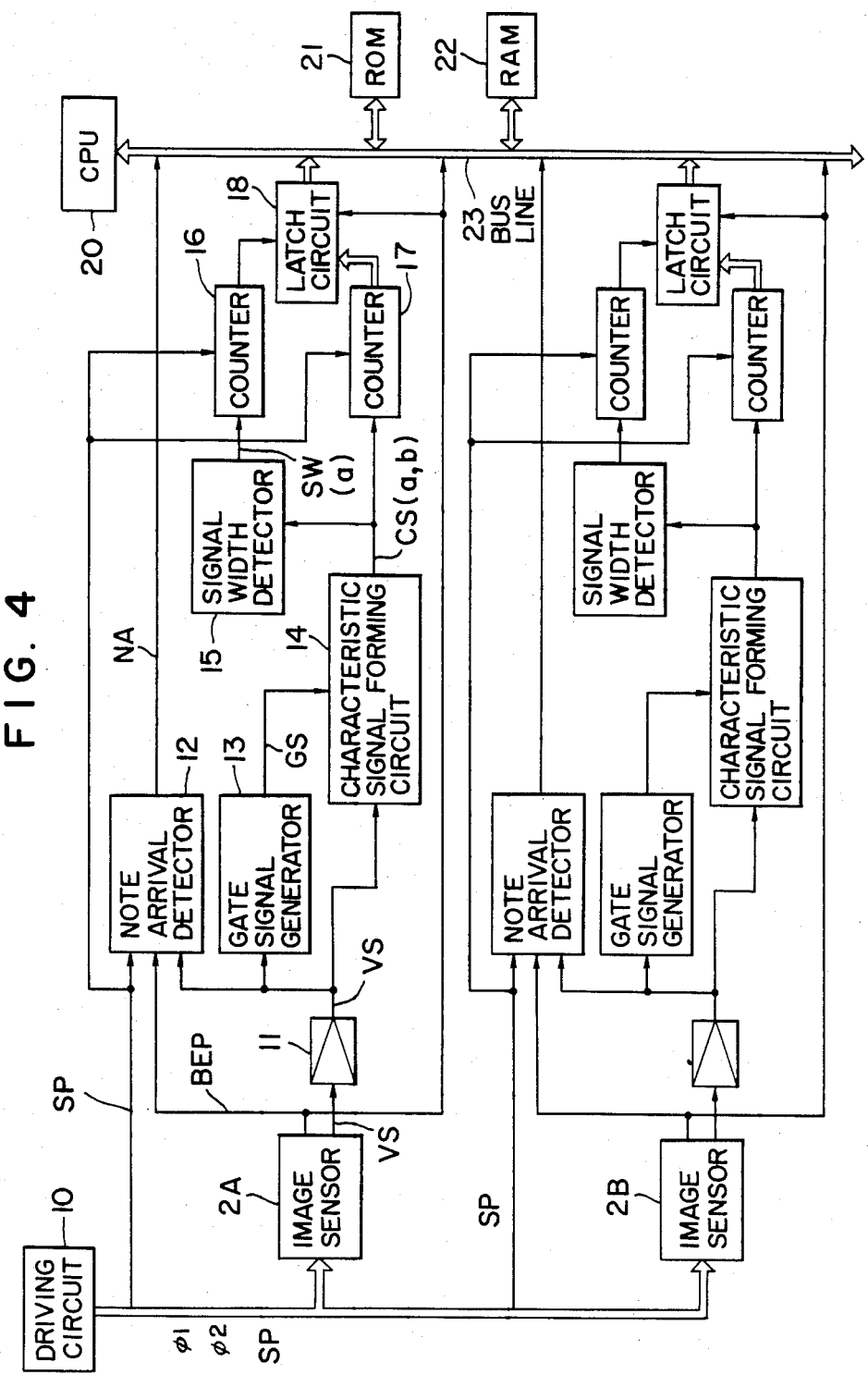
FIG. 4 is a block diagram to show an example of the circuit structure of this invention.

FIG. 4 shows the circuit of the bank bill identification device wherein a pair of image sensors 2A and 2B have respective circuit system. As their circuits are entirely identical to each other, the description will be given to the structure of the circuit of the image sensor 2A alone. The image sensor 2A is made to be driven by a driving circuit 10 and the driving circuit 10 outputs a start pulse SP and clock pulses $\phi_1$ and $\phi_2$. A video signal VS which is outputted from the image sensor 2A is amplified to a predetermined amplitude level by an amplifier 11, and inputted to a note arrival detector 12, a gate signal generator 13 and a characteristic signal forming circuit 14. A bit-end-pulse BEP which is outputted from the image sensor 2A to indicate the final bit of a scanning is inputted to the note arrival detector 12 and a latch circuit 18. A start pulse SP from the driving circuit 10 is inputted to the note arrival detector 12 as well as to counters 16 and 17. A gate signal GS which is generated at a gate signal generator 13 is inputted to characteristic signal forming circuit 14 while a characteristic detection signal CS (a-signal and b-signal) is inputted to the counter 17 for counting as well as to a signal width detector 15. A signal SW (a-signal) from the detector 15 is inputted to the counter 16 for computation. The values thus counted at the counters 16 and 17 are made to output after being latched by a latch circuit 18 with a bit-end-pulse BEP from the image sensor 2A. The counters 16 and 17 are cleared for every scanning with a start pulse SP from the driving circuit 10. The whole device is controlled by CPU (Central Processing Unit) 20 wherein ROM (Read Only Memory) 21 and RAM (Random Access Memory) 22 are connected through a bus line 23 so that the outputs from the latch circuit 18, a note arrival signal NA from the note arrival detector 12 and a bit-end-pulse BEP from the image sensor 2A are inputted to the CPU 20 through the bus line 23.

Figure 5:
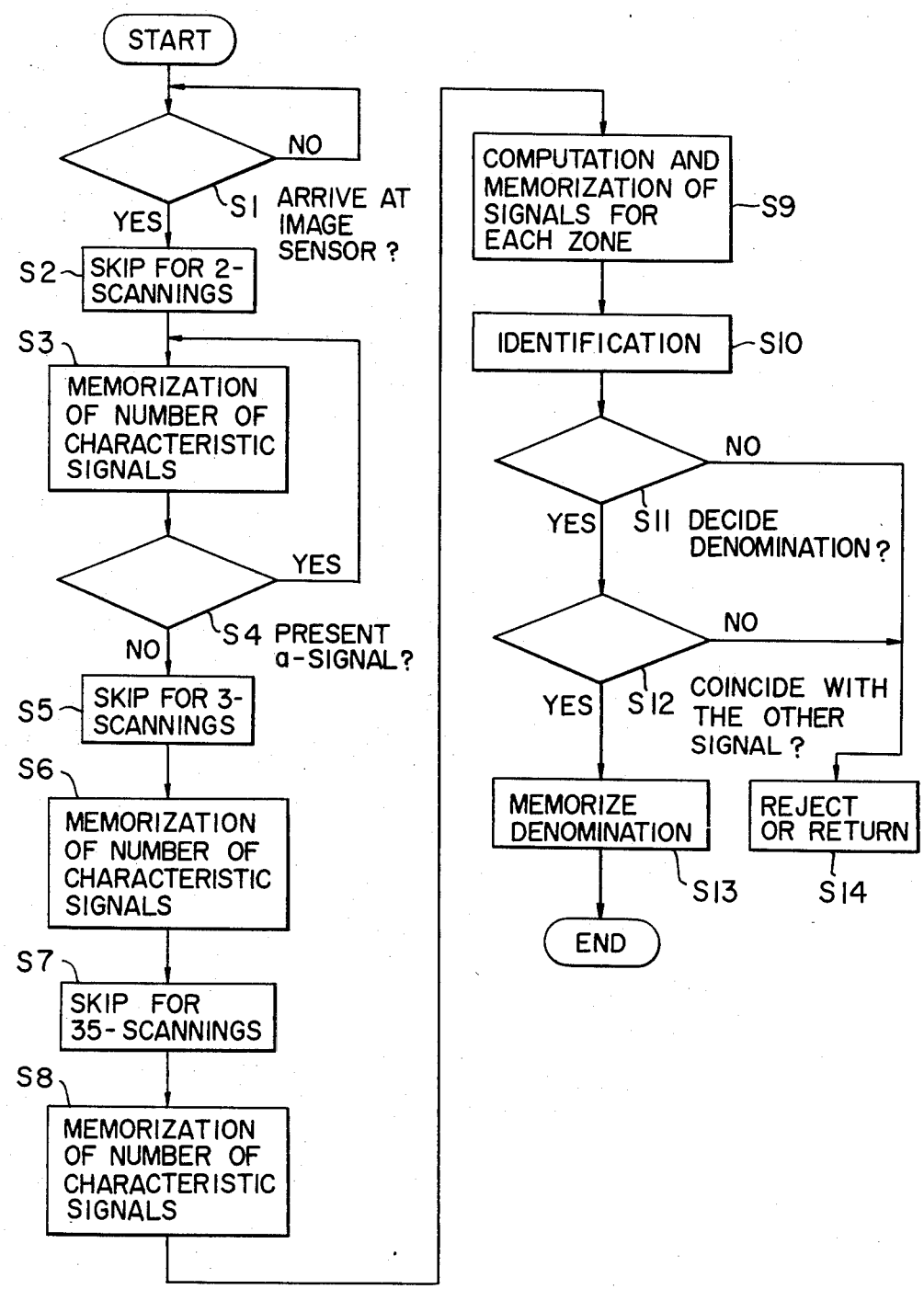
FIG. 5 is a flow chart to explain the operation thereof.

The operation of the device having the aforementioned structure will be explained referring to the flow chart shown in FIG. 5.

The image sensor 2A repeatedly scans a note 1 from its outside to inside. As the note 1 moves to the direction shown by the arrow, two-dimensional data is obtained from the image sensor 2A (refer to FIG. 6). In this embodiment, the note 1 is made to move by about 0.83 mm for one scanning of the sensor 2A. The upper portion of the note 1 where numerical figures are printed is defined as Zone 1 (zones 11 and 12) and the lower portion thereof where figures are printed is defined as Zone 2 (zones 21 and 22) (refer to FIGS. 7 and 8). When the note 1 has not yet reached the position of the image sensor 2A, as a weak light reflected from the roller 5 reaches the image sensor 2A, the output VS from the image sensor 2A is in a low level and the note arrival detector 12 does not output a signal NA. The note arrival detector 12 is made to amplify a video signal VS which is outputted from the image sensor 2A in time series, starts integration with a start pulse SP, and is reset with a bit-end-pulse BEP. When an integrated value exceeds a predetermined level, it makes the note arrival detection signal NA, for example, "H". More specifically, when the edge of a note 1 has arrived at the image sensor A, the image sensor 2A outputs a high level signal in correspondence to the whiteness of the note, thereby the integrated value exceeds the predetermined level or, in other words, notifies the arrival of the note 1 therewith. Even though printed figures are not correctly registered, the edge portion in the upper or lower side of the note surely exists. The spectral sensitivity characteristics of the image sensor 2A range from visible region to near infrared region. Although the light reflected from a stained note is lowered in the intensity of the short wavelength spectrum compared with a new note, the intensity in the long wavelength spectrum thereof has been found not to be lowered drastically by experiments. The output VS from this image sensor therefore will not vary drastically between a new note and an old stained note.

Figures 8, 9:
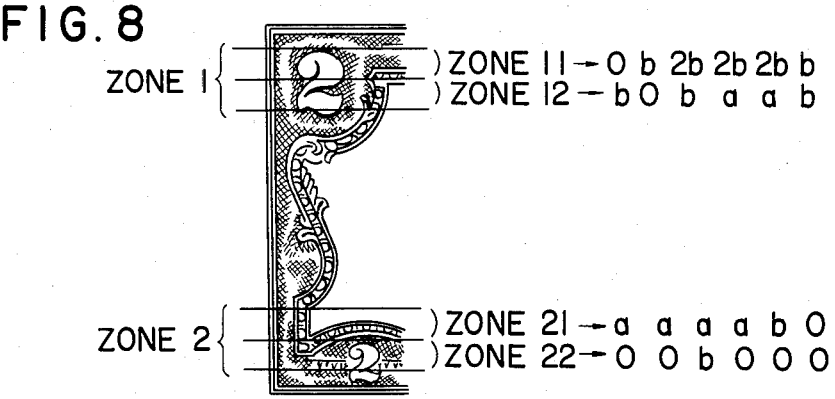
FIG. 9 is a diagram to show the memory content in RAM.

When the arrival of a note 1 is detected at the position of the image sensor 2A (Step 1), the scanning data for two scannings is skipped without memorizing (Step 2). The number of characteristic signals CS and SW which are obtained by the next scanning is stored in RAM 22 (Step 3). It is judged from the content (presence or absence of a-signal which will be described hereinafter) thereof whether the edge portion of the note 1 has already passed away or not (Step 4). Explanation to form characteristic signals CS and SW will be described hereinafter. If the edge portion of the note has already passed, the scanning for three times will be skipped (Step 5) and the number of the characteristic signals CS and SW of the Zone 1 which corresponds to the upper figure-printed portion and which is obtained from the subsequent 12-scannings will be memorized in RAM 22 for each scanning (Step 6). At the initial time of the Step 6, the scanning position of the note 1 lies at the upper end of the Zone 1 shown in FIG. 6. Then, the scanning for 35 times corresponding to the central portion in the transverse direction of the note 1 is skipped (Step 7). The number of the characteristic signals CS and SW for the 12-scannings of the Zone 2 corresponding to the lower figure-printed portion is stored in RAM 22 for each time (Step 8). After computation, the value is compared with the stored data to identify the denomination (Steps 9 and 10). The memory content in the RAM 22 is exemplified as shown in FIG. 9 which will be described hereinafter in more detail. The result is judged whether it is identical to the identification made by the data obtained from the other sensor 2B or not. If the coincidental identification is not obtained, the note detected is judged as a counterfeit and either rejected or returned (Steps 11, 12 and 14). When the denominations detected by the two image sensors coincide, the denomination data is stored in RAM 22 to terminate the process (Steps 10 to 13).

Description will now be given to the formation of characteristic signals CS (a-signal and b-signal) and SW (a-signal).

The gate signal generator 13 for reading the characteristic signals is adapted to let the output VS from the image sensor 2A pass for a predetermined distance away from the time when the white edge portion on a side of the note 1 disappears or from the beginning of the printed pattern thereof so that it is not influenced even if the printed pattern is mis-aligned. The output VS from the image sensor 2A is sliced at a predetermined level for encoding. The pulse of "H" level is generated for only a given time from the fall of the first pulse or in other words from the time when the edge portion ends and the printed pattern begins. The gate signal generator 13 may be constructed by combining integration circuits, flip-flops or the like in a manner to set a flip-flop by the fall of the first pulse, integrate the outputs of "H" level from the flip-flop and make a gate signal GS to fall at the time when the integrated value becomes a predetermined value. In the case where the edge portion on a side of a note 1 is broken, the gate signal GS would be generated from the fall of the first characteristic signals CS (which will be referred hereinafter). In such a case, the output VS from the image sensor 2A is sliced at a still lower level than the above mentioned case (or the reference level which makes the printed pattern an "H" level) for encoding, a short pulse is generated from the rise of the first pulse, and a gate signal GS is generated for a predetermined time from the fall of the pulse. In the case of an unbroken note, logic OR is obtained for the short pulse and the first pulse, and a gate signal GS is generated from the fall of that output.

The characteristic signal forming circuit 14 and the signal width detector 15 which comprise a means for forming characteristic signals will now be described.

The characteristic signal forming circuit 14 processes video signal VS from the image sensor 2A to eliminate unnecessary signals so as to extract only the signals for the figured portion on the note 1. In operation the circuit slices the video signal VS at a level for encoding, integrates the sliced signal and eliminates the signal in which the integrated value does not reach a predetermined value, and generates pulses from the signals which reach the predetermined value. This invention notes the fact that the white portion continues for a predetermined length on the figured portion of a note and uses it for forming characteristic signals CS. As the white portion inside the figure portion of a note may be recognized as the characteristic signals CS due to lateral displacement of the note, when characteristic signals CS are parted from each other beyond a given distance, the latter signal should be eliminated. The characteristic signal apart from the preceding one by a predetermined distance can be eliminated, for instance, by using a flip-flop to generate and integrate pulses of "H" level from the fall of a characteristic signal to the fall of another characteristic signal subsequent thereto, making the portion which exceeds the predetermined value as "H" level and obtaining logic AND of the signal and the characteristic signal. The characteristic signals CS thus obtained are inputted to the counter 17 for computation, latched in a latch circuit 18 with a bit-end-pulse BEP and stored at a predetermined address in RAM 22 with a read-out command from CPU 20. The width of a characteristic signals CS may sometimes be large. A signal of a larger width is obtained only when the lateral portion of the letter "5" on a 5-dollar note or the lateral portion of the letter "2" on a 20-dollar note is scanned by an image sensor. In order to discriminate such a signal of larger width from other characteristic signals, a signal width detection circuit 15 is provided.

Figure 6:
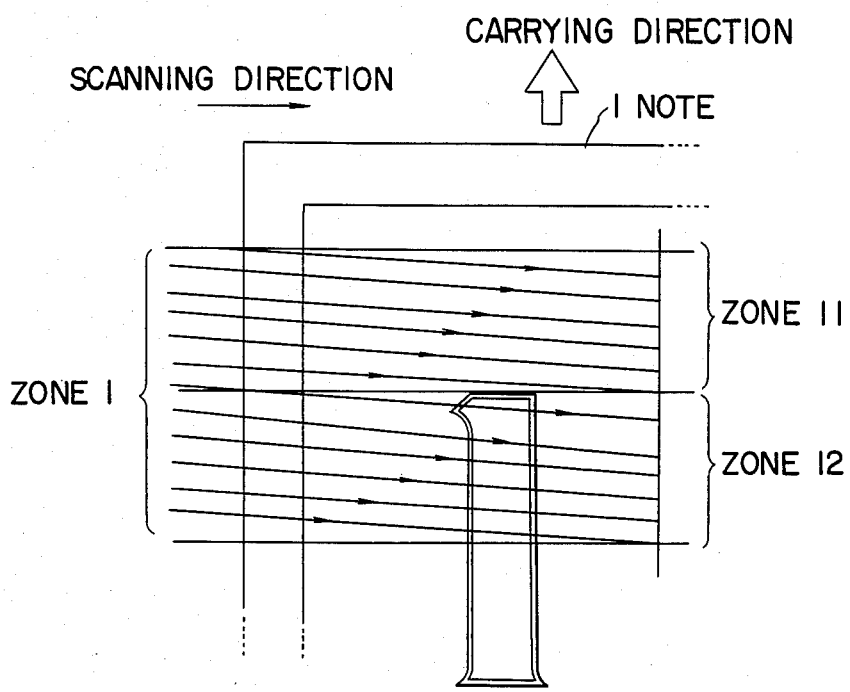
FIGS. 6 through 8 are diagrams respectively explaining conditions for reading the denomination figures.
Figure 7:
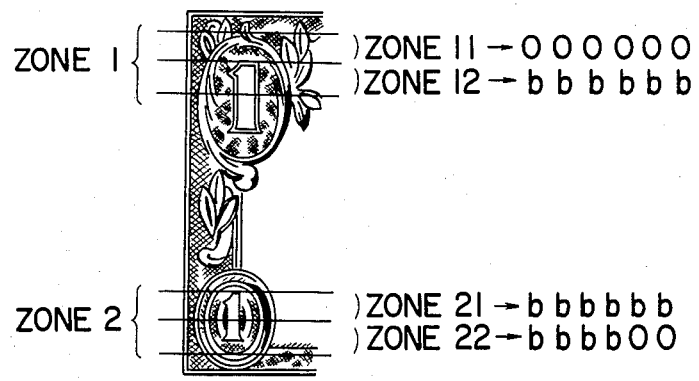

The signal width detector circuit 15 is made to integrate characteristic signals CS and to output pulses SW of "H" level only when it exceeds a predetermined reference level. When this signal SW is obtained, it is detectable that the width of the characteristic signals CS is widened narrowing the possibility of identification to either one of a 5-dollar note, a 20-dollar note or a counterfeit. A signal SW may be obtained from the upper edge of an authentic note. The signal SW from the signal width detector 15 is referred to herein as the characteristic signal of a-signal while the other characteristic signals of narrower width are referred to as the one of b-signal. Such an a-signal is outputted only one for one scanning at most, but is inputted to the counter 16. The presence or the absence thereof is memorized in the latch circuit 18 with a bit-end pulse BEP, and stored in RAM 22 with a command from the CPU 20. The counter 17 counts both a-signal and b-signal. For instance, when "100" is stored in RAM 22 (refer to FIG. 9), as the first digit "1" represents the presence/absence of a-signal while the other three digits "001" indicate the sum of the number of a-signal and b-signal, this case indicates that one a-signal is obtained by one scanning. When "1011" is stored, it indicates that one a-signal and two b-signals are stored. As is mentioned above, the data for 12 times is first stored. When the note is in positive direction, the data for the upper left numerical portion is obtained while it is in the opposite direction, and the data of the right lower numerical portion is obtained. After scanning for 35 times, the data for 12-scannings is newly stored. Viewing the note 1 in a positive direction, the scanning zone for 12 times on the upper left portion as shown in FIGS. 6, 7 and 8 is defined as the Zone 1, which is further divided into zone 11 and zone 12 by 6-scannings. The data zone for 12-scannings of the lower left portion of a note is defined as the Zone 2, which is similarly divided into zone 21 and zone 22.

When neither a-signal nor b-signal is obtained by one scanning, the signal is assumed to be "0", when one b-signal is obtained by one scanning, the signal is assumed to be "b", when two b-signals are obtained, the signal is assumed to be "2b", followed similarly by "3b", "4b", "5b", "6b", . . . and so forth. When only a-signal is obtained, it is made "a"; when an a-signal and a b-signal are obtained, it is made "a+b"; and when an a-signal and two b-signals are obtained, it is made "a+2b". The scanning data of 6 times on the zone 11 is first processed to know which combination the data falls under and the resulted sums are respectively stored (refer to FIG. 9). Examples are shown below:

If it is assumed here,
"0000"
"0000"
"0001"→one b-signal→falls under "b"
"0010"→two b-signals→falls under "2b"
"0010"→two b-signals→falls under "2b"
"0000", "1" which indicates one time is stored at the address "2052" and "2" indicating two times is stored at the address "2053" instead of storing "1" at "5b". In a similar manner, the data are processed for the zones 12, 21 and 22. The numbers of combinations on each zone thus obtained (an example is shown in FIG. 9) are compared with the patterns which have been stored in ROM 21 for each denomination, thereby identifying the denomination of the note. For example, if it is the positive direction of a one-dollar note, "0" will be outputted for more than 5 times continuously on the zone 11 as shown in FIG. 7, and "b" will be outputted more than 5 on the zone 12. If "a" is "0" on the Zone 1, it is judged OK for the case of a one-dollar note. The combination will be arbitrarily selected to discriminate denominations and distinguish counterfeits. Table 1 shows the identification table for one-dollar notes shown in FIG. 7 while Table 2 for two-dollar notes shown in FIG. 8.

TABLE 1

| Zone 1 | | Zone 2 | |
|---|---|---|---|
| Zone 11 | Zone 12 | Zone 21 | Zone 22 |
| Continuation b ≧ 6 | | Continuation b ≧ 7 | |
| 0b ≧ 2 | Continuation | 4b + 5b = 0 | 4b + 5b < 2 |
| 4b + 5b < 2 | b ≧ 5 | | TA ≦ 2 |
| TA ≦ 2 | 4b + 5b = 0 | | |
| | TA = 0 | | |

TABLE 2

| Zone 1 | | Zone 2 | |
|---|---|---|---|
| Zone 11 | Zone 12 | Zone 21 | Zone 22 |
| 2 ≦ Continuation 2b ≦ 4 | 1 ≦ TA ≦ 2 | 3b + 4b + 5b = 0 | 3b + 4b + 5b = 0 |
| | 3b + 4b + 5b = 0 | 2 ≦ TA ≦ 5 | TA = 0 |
| 0 + b + 2b = 6 | | | | wherein TA=a+(a+b)+(a+2b) and 5b and 6b are added to form a new 5b.

When the results for the zones 11, 12, 21 and 22 on the left side of a note come out ambiguously, the note might have been conveyed in the opposite direction. The zone data therefore should be inverted in the order like 22, 21, 12 and 11 for comparison.

In the manner mentioned above, a note is identified for the denomination by one image sensor 2A as well as by the other image sensor 2B and only when the results from both sensors coincide, it is judged affirmative.

Figure 10:
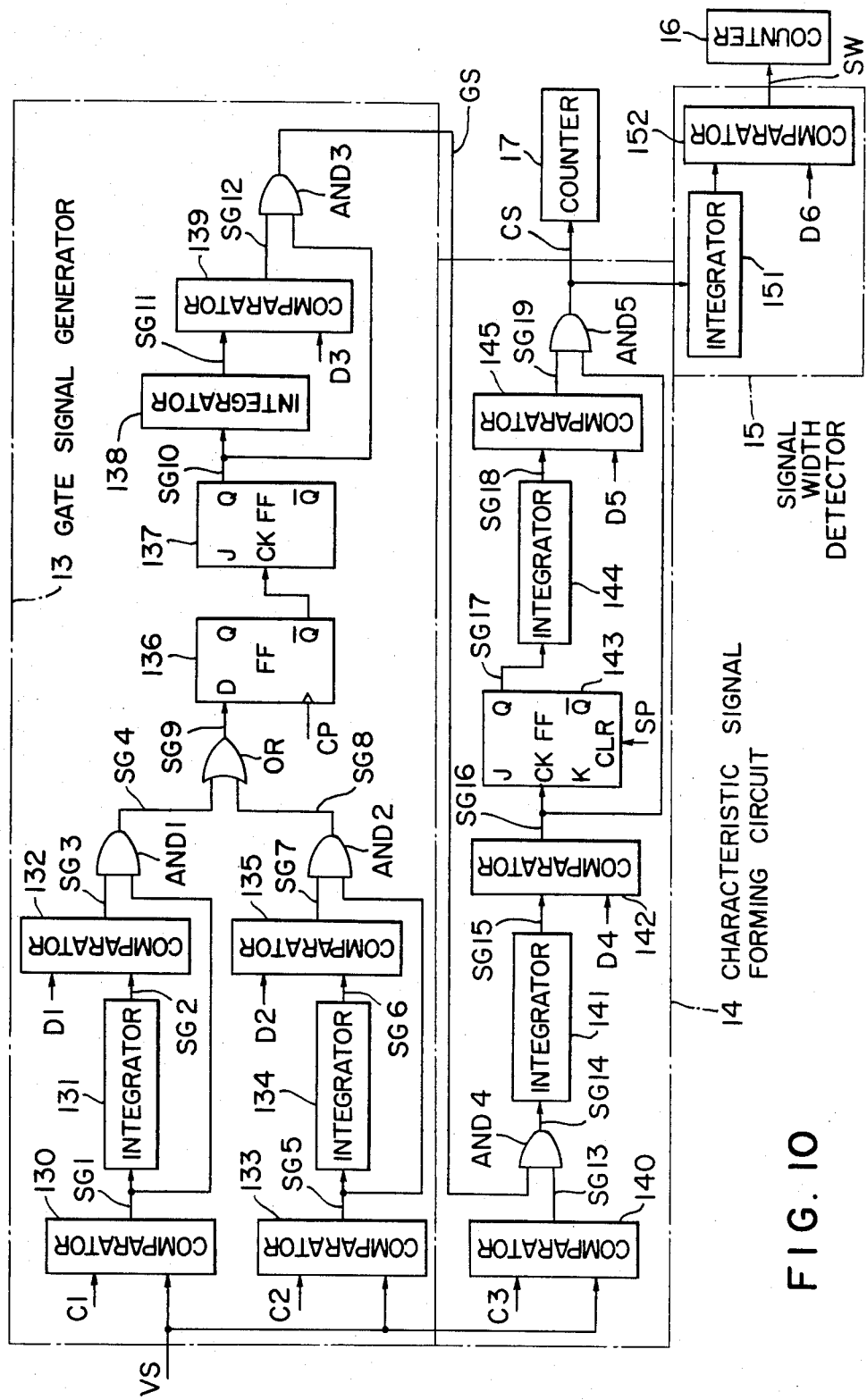
FIG. 10 is a block diagram to show an example of a circuit in more detail.

FIG. 10 shows an embodiment of a circuit comprising a characteristic signal forming circuit 14, a gate signal generator 13 and a signal width detector 15. The operation thereof will be described referring to the waveforms shown in FIGS. 11 through 13.

Figure 11A:
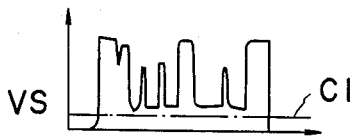
FIGS 11A through 11E, FIGS. 12A through 12H, 12J and 12K and FIGS. 13A through 13H and 13J are waveforms to show examples of the operation thereof, respectively.
Figure 11B:
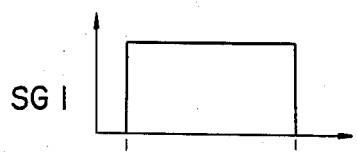
Figure 11C:
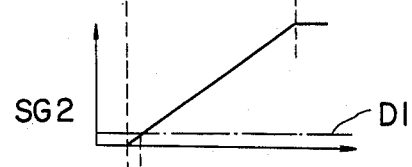
Figure 11D:
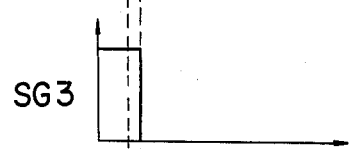
Figure 11E:
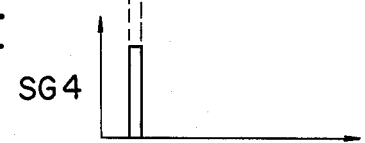
Figure 12A:
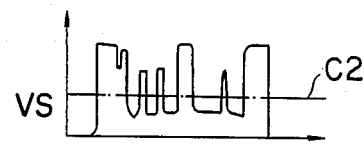
Figure 12B:
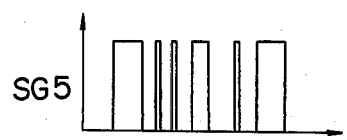
Figure 12C:
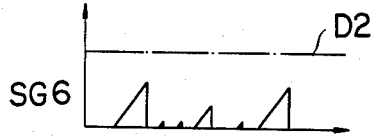
Figure 12D:
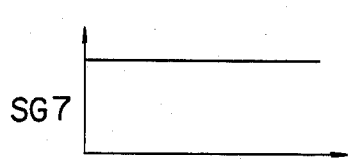
Figure 12E:
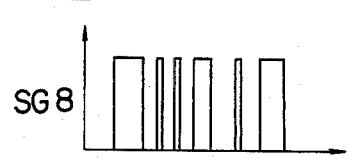
Figure 12F:
Figure 12G:
Figure 12H:
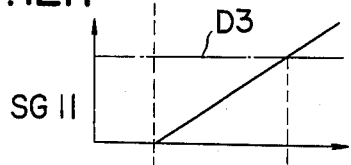
Figure 12J:
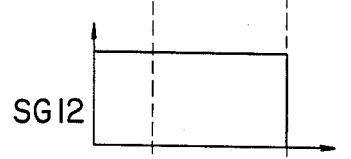
Figure 12K:
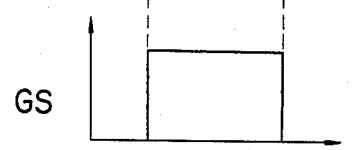

A video signal VS from the image sensor 2A is inputted into comparators 130 and 133 inside the gate signal generator 13. The signal is compared with a preset reference value C1 of a low level by the comparator 130 as shown in FIG. 11A while it is compared with the preset reference value C2 of a medium level by the comparator 133 as shown in FIG. 12A. Accordingly, the output SG1 from the comparator 130 becomes as shown in FIG. 11B while the output SG5 from the comparator 133 becomes as shown in FIG. 2B. The integrator 131 integrates the output SG1 from the comparator 130 by linear sweep as shown in FIG. 11C. The integrated value SG2 is compared with the preset value D1 by the comparator 132 to make the output SG3 therefrom as shown in FIG. 11D. The output SG3 from the comparator 132 is inputted into a logic gate AND 1 together with the output SG1 from the comparator 130. The output SG4 therefrom becomes as shown in FIG. 11E. Similarly, the output SG5 from the comparator 133 is integrated by linear sweep by an integrator 134 as shown in FIG. 12C, and the integrated value SG6 is compared with the preset value D2 by the comparator 135. The output SG7 from the comparator 135 becomes as shown in FIG. 12D and is inputted into a logic gate AND 2 together with the signal SG5 to thereby output a signal SG8 from the gate AND 2 as shown in FIG. 12E. The outputs SG4 and SG8 from the logic gates AND 1 and AND 2 are inputted respectively to OR gates; the OR output SG9 therefrom is inputted into the D-terminal of a D-flip-flop 136 as shown in FIG. 12F, and is inverted into the output corresponding to clock pulses CP. As the signal SG9 is logic OR of the signals SG4 and SG8, if the side of a note is broken, a signal SG4 is outputted from the OR gate OR as shown by the broken lines in FIG. 12F. The $\overline{Q}$ output from the flip-flop 136 is inputted to the clock terminal CK of a JK-flip-flop 137 of the next step to proceed a predetermined distance from the edge of the note as shown in FIG. 12G, or in other words to output a signal SG10 of "H" from the beginning of the patterned portion of the note. The signal SG10 is integrated by an integrator 138 as shown in FIG. 12H. The integrated signal SG11 is inputted into a comparator 139 to be compared with the preset value D3 and converted into a binary signal SG12 as shown in FIG. 12J. The output SG12 from a comparator 139 is inputted together with the output SG10 from the flip-flop 137 into a logic gate AND 3, whereby the gate AND 3 outputs a gate signal GS eliminating the edge portion of the note as shown in FIG. 12K.

Figure 13A:
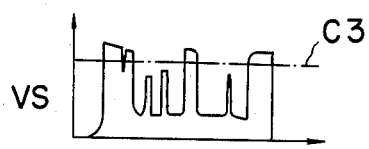
Figure 13B:
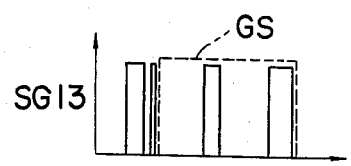
Figure 13C:
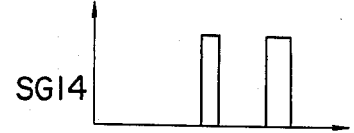
Figure 13D:
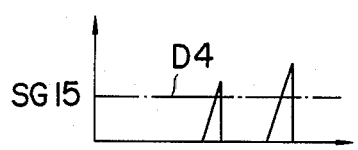
Figure 13E:
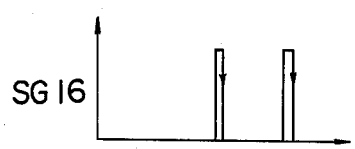
Figure 13F:
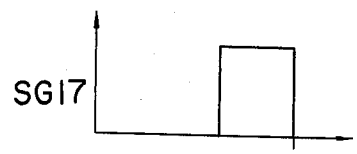
Figure 13G:
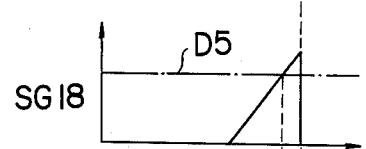
Figure 13H:
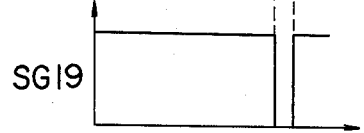
Figure 13J:
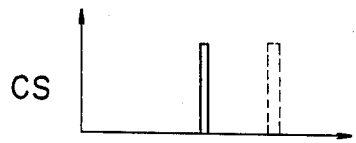

The video signal VS from the image sensor 2A, on the other hand, is inputted into a comparator 140 inside a characteristic signal forming circuit 14, and compared with the preset value C3 of a high level as shown in FIG. 13A to output a binary signal SG13 as shown in FIG. 13B. The signal SG13 is inputted into a logic gate AND 4 together with the gate signal GS, thereby to output an AND signal SG14 therefrom as shown in FIG. 13C. The signal SG14 is integrated by an integrator 141 as shown in FIG. 13D. The integrated signal SG15 is inputted to a comparator 142 to be compared with the preset value D4. The output SG16 therefrom becomes as shown in FIG. 13E. The signal SG16 is inputted into the clock terminal CK of a JK-flip-flop 143 as well as into a logic gate AND 5. The flip-flop 143 is cleared when start pulse SP is inputted thereto from the driving circuit 10, is set with the first pulse of the signal SG16, and reset with the subsequent pulse. Therefore, Q output SG17 of the flip-flop 143 becomes as shown in FIG. 13F and the signal SG17 is integrated by an integrator 144 (FIG. 13G). As the integrated signal SG18 is compared with the preset value D5 by a comparator 145 to become a binary signal, the output SG19 therefrom becomes as shown in FIG. 13H. The AND output CS from the gate AND 5 is formed as shown in FIG. 13J to thereby eliminate pulses subsequent thereto. The characteristic signal CS is inputted into the counter 17 for counting as well as into an integrator 151 inside a signal width detector 15 to be integrated by linear sweep. The output from the integrator 151 is compared with the preset value D6 by a comparator 152, whereby a signal SW will become "H" only when the pulse width of a characteristic signal CS is widened and is outputted from the comparator 152 to be counted by the counter 16.

Although the operation is described in positive logic hereinabove, it may naturally be operable in negative logic. In case the size of notes varies depending on denomination types, this invention may be applicable to Japanese paper moneys if the position of the image sensors is modified or the number thereof is increased. The output level may sometimes be lowered by stains in a certain type of image sensors. In such a case, erroneous identification can be avoided by obtaining an integration value for the scanning of the edge portion of a note, and using that value in setting a reference level. Although description has been given to the case where only one comparison reference level is provided for the characteristic signal forming circuit in the above, one or more levels may be added for respective encoding. If thus obtained codes are processed in a manner similar to the above, notes can be identified at a higher efficiency as they can be identified by the results of the levels 2 and 3 even if they are not identified in denomination by the comparison of the first level alone. In the device according to this invention, notes may be conveyed in the longitudinal direction or may be kept still for identification if two-dimensional sensors are used.

The identification device according to this invention enables accurate and efficient identification among notes of different denominations having the same size because it is adapted to extract characteristics of the numerical figures printed on notes.

What is claimed is:
1. A bank bill identification device which comprises:
  a conveying means which conveys a note in a predetermined direction;
  a light source which projects light onto said note;
  one-dimensional image sensors which are arrayed linearly in a predetermined direction of said note and which repeatedly output in time series signals corresponding to the light reflected from said note when said sensors scan said note;
  a characteristic signal forming means which encodes the output from said one-dimensional image sensors to form first characteristic signals of a signal width corresponding to the width of the numerical figures representing a denomination printed on a surface of said note;

a signal pulsewidth detecting means which inputs said first characteristic signals from said characteristic signal forming means and outputs second characteristic signals which indicate that said width of the numerical figures representing said denomination of said note exceed a second predetermined value when said first characteristic signals exceed a first predetermined value in their pulsewidth; and a memory/arithmetic means which stores the number of said first characteristic signals from said characteristic signal forming means and the presence of said second characteristic signals from said signal pulsewidth detecting means for each scanning of said note by said one-dimensional image sensors, and which computes the thus stored data, and which compares the data with the data which has been stored data, and compares the data with the data which has been stored corresponding to denominations of notes, and identifies the denomination of said note.

2. A bank bill identification device as claimed in claim 1, wherein said conveying means comprising a plural number of rollers, one of the rollers is provided on an opposing position to said one-dimensional image sensors and has a surface which is blackened.

3. A bank bill identfication device as claimed in claim 1, wherein said one-dimensional image sensors comprise with CCDs.

4. A bank bill identification device as claimed in claim 1, wherein a lens system is provided between said note and said one-dimensional image sensors to converge light reflected from said note.

5. A bank bill identification device as claimed in claim 4, wherein said lens system comprises Selfoc lens arrays.

6. A bank bill identification device as claimed in claim 1, wherein the conveying direction of said note by said conveying means is a transverse direction and the arrangement direction of a plural number of photoelectric conversion elements in said one-dimensional image sensors is a longitudinal direction of said note.

7. A bank bill identification device as claimed in claim 1, wherein the conveying direction of note by said conveying means is a longitudinal direction and the arrangement direction of a plural number of photoelectric conversion elements in said one-dimensional image sensors is a transverse direction of said note.

8. A bank bill identification device which comprises:
a conveying means comprising a plurality of rollers and guide plates for conveying a note in transverse direction;
a light source which projects light onto said note;
one-dimensional image sensors which are linearly arranged in transverse direction of the note and which repeatedly output video signals, in time serial manner, corresponding to the light reflected from said note when said sensors scan said note;
a lens system which converges the light reflected from said note to said one-dimensional image sensors;
a gate signal generator which generates gate signals in response to said video signal which is output from said one-dimensional image sensors;
a characteristic signal forming circuit which outputs a first characteristic signal of said note in response to said gate signals from said gate signal generator and said video signals from said image sensors;
a signal pulsewidth detector which outputs a second characteristic signal in response to said first characteristic signal;
a first counter which counts said first characteristic signal; and
an identification circuit which compares the values counted by said first and second counters with data which has been stored corresponding to denominations of notes, so as to thereby identify the denominations of said note.

9. A bank bill identification device as claimed in claim 8, wherein said image sensors comprise CCDs and said lens system comprises Selfoc lens arrays.

10. A bank bill identification device as claimed in claim 8, wherein said gate signal generator comprises:
a first comparator which compares said video signals which a first preset value of a low level;
a second comparator which compares said video signals with a second preset value of a medium level;
a first comparator/integrator means which integrates an output from said first comparator and compares it with a third preset value;
a second comparator-integrator means which integrates an output from said second comparator and compares it with a fourth preset value;
a gate logic circuit which receives as inputs comparison outputs from said first and second comparators and said first and second comparator/integrator means and outputs edge portion terminal signals which indicate a predetermined distance from the edge portions of said note;
a third comparator/integrator means which integrates said edge portion signals and compares it with a fifth present value; and
a first logic circuit which receives as its inputs an output of said third comparator/integrator means and said edge portion signals so as to form said gate signals.

11. A bank bill identification device as claimed in claim 10, wherein said signal pulsewidth detector comprises an integrator which integrates said first characteristic signals and a ninth comparator which compares an itegrated output of said integrator with a ninth preset value.

12. A bank bill identification device as claimed in claim 8, wherein said characteristic signal forming circuit comprises:
a third comparator which compares said video signal with a sixth preset value of a high level;
a fourth comparator/integrator means which integrates a logically ANDed combination of an output from said third comparator and said gate signal, and compares it with a seventh preset value;
a flip-flop which receives a comparison output of said fourth comparator/integrator means as a clock input;
a fifth comparator which integrates a set output of said flip-flop and compares it with an eighth preset value; and
a second logic circuit which receives respective comparison outputs from said fourth comparator/integrator means and said fifth comparator and forms said first characteristic signal in response thereto.

13. A bank bill indentification device as claimed in claim 12, wherein said signal pulsewidth detector comprises an integrator which integrates said first characteristic signal and a fourth comparator which compares an integrated output of said integrator with a ninth preset value.

* * * * *